United States Patent
Forté

(10) Patent No.: US 7,430,262 B2
(45) Date of Patent: Sep. 30, 2008

(54) FRAME SYNCHRONIZATION METHOD AND SYSTEM

(75) Inventor: Michel Forté, Ville St-Laurent (CA)

(73) Assignee: Defense Ultra Electronics Canada Inc., Montréal (CA)

( * ) Notice: Subject to any disclaimer, the term of this patent is extended or adjusted under 35 U.S.C. 154(b) by 491 days.

(21) Appl. No.: 10/468,150

(22) PCT Filed: Mar. 19, 2001

(86) PCT No.: PCT/CA01/00362

§ 371 (c)(1),
(2), (4) Date: Feb. 12, 2004

(87) PCT Pub. No.: WO02/073848

PCT Pub. Date: Sep. 19, 2002

(65) Prior Publication Data

US 2004/0120438 A1    Jun. 24, 2004

(51) Int. Cl.
*H04L 7/00*    (2006.01)
(52) U.S. Cl. .................. 375/367; 375/365; 370/515
(58) Field of Classification Search ............. 370/503, 370/509, 510, 512, 513, 514, 515, 506; 375/365, 375/366, 367, 368; 380/268, 270
See application file for complete search history.

(56) References Cited

U.S. PATENT DOCUMENTS

| | | | |
|---|---|---|---|
| 3,920,894 A * | 11/1975 | Shirley et al. .................. 380/46 |
| 4,757,536 A | 7/1988 | Szczutkowski et al. | |
| 4,866,773 A | 9/1989 | Lubarsky | |
| 4,975,952 A | 12/1990 | Mabey et al. | |
| 5,003,599 A | 3/1991 | Landry | |
| 5,007,088 A * | 4/1991 | Ooi et al. ....................... 380/46 |
| 5,056,105 A * | 10/1991 | Darmon et al. ............. 375/130 |
| 5,185,796 A | 2/1993 | Wilson | |
| 5,243,650 A * | 9/1993 | Roth et al. ................... 380/237 |
| 5,898,698 A * | 4/1999 | Bross ......................... 714/701 |

(Continued)

FOREIGN PATENT DOCUMENTS

JP        61117939        6/1986

OTHER PUBLICATIONS

Marc M.Darmon, Philippe R.Sadot, 1989 IEEE, Alcatel Transmissions Par Faisceaux Hertziens—ATFH, Military Transmissions Department, 92301—Levallois-Perret, France, "A New Pseudo-Random Interleaving For Antijamming Applications".*

(Continued)

*Primary Examiner*—Chieh M. Fan
*Assistant Examiner*—Aristocratis Fotakis
(74) *Attorney, Agent, or Firm*—Ogilvy Renault, LLP (57) ABSTRACT

A method and system for frame synchronization in a digital data transmission. A synchronization word is selected that is suitable for good correlation in a receiver detector. Either traffic bits or control bits are interleaved within the synchronization word in a predetermined pattern that is fixed for consecutive frames. The position of the sync word is varied from frame-to-frame. Also, the interleaved bits that are either traffic or control bits varies substantially between consecutive frames.

21 Claims, 5 Drawing Sheets

U.S. PATENT DOCUMENTS 6,067,646 A * 5/2000 Starr .......................... 714/701
6,522,665 B1 * 2/2003 Suzuki et al. ............... 370/471
6,535,502 B1 * 3/2003 Brink ......................... 370/345
6,643,342 B1 * 11/2003 Wakabayashi .............. 385/364

OTHER PUBLICATIONS

P.J Mabey, 1982 IEEE, Philips Research Laboratories, Redhill, Surrey, RH1 5HA, UK, "Predicting the range and throughput of mobile data systems".*

* cited by examiner

FRAME SYNCHRONIZATION METHOD AND SYSTEM

BACKGROUND OF THE INVENTION

The present invention relates to a method of frame synchronization in a digital data transmission. The present invention also relates to a frame synchronization system that embodies the method of this invention.

In frame synchronization systems, particularly for critical applications, such as in military applications, it is becoming more important to use a scheme wherein the transmitted data (traffic) can not be easily deciphered or decoded by an eavesdropper. In this regard, a typical data transmission sequence is composed of consecutive frames of traffic data (bits) and an overhead word (bits). It is furthermore typical to provide, usually as part of the overhead word, a frame synchronization signal, usually of multiple bits disposed at the same position of each frame, usually at the start position of a frame. With such a fixed position synchronization word, there is not the level of security that one would like to see. Also, existing techniques may be susceptible to a loss of synchronization, and are, furthermore, not well adapted to provide rapid re-synchronization.

Accordingly, it is an object of the present invention to provide a method and system of frame synchronization in a digital data transmission and in which there is practiced a scheme that enhances the security of the transmission.

SUMMARY OF THE INVENTION

In accordance with the present invention there is provided a method of frame synchronization in a digital data transmission. This method comprises the steps of selecting a synchronization word suitable for good correlation in a receiver detector and interleaving bits of at least one of traffic bits and control bits within the synchronization word in a predetermined pattern and fixed for consecutive frames. A feature of the present invention is that the interleaved at least one of traffic bits and control bits varies substantially between consecutive frames. A further step of the method comprises varying a position of the interleaved synchronization word and at least one of traffic bits and control bits within consecutive frames in the transmission and in a predictable manner. In a preferred embodiment disclosed herein, the step of interleaving comprises interleaving the control bits, with the control bits defining the position, said position varying according to a pseudo-random function. The step of interleaving may also be comprised of interleaving only control bits within the synchronization word. Additional overhead bits may comprise an orderwire word and a radio information link word. The additional overhead bits are positioned adjacent the interleaved bits.

Furthermore, in accordance with the present invention there may be the additional steps of detecting, at a receiver, both the synchronization word and the control bits. Next is detecting an error in the synchronization word. Then is the step of confirming that the synchronization is valid when the error is detected and the control bits detected match and expected next value from the pseudo-random function. The synchronization word may have an autocorrelation characterized by a number of bits that are alike being not larger than $n/2+2$, where n is the number of synchronization word bits compared. In the disclosed embodiment there are 15 control bits and a synchronization word comprises 49 bits for a total of 64 bits. A further step of the present invention may comprise scrambling or encrypting the traffic bits using the position determined according to the pseudo-random function.

Also, in accordance with the present invention there is provided a frame synchronization system for a digital data transmission. The system comprises a synchronization store for providing a synchronization word, a pseudo-random number generator for providing a control word including control bits, and an interleaver coupled from the synchronization store and the pseudo-random generator for interleaving the control bits within the synchronization word in a predetermined pattern that is fixed for consecutive frames, and in which the control bits vary substantially between consecutive frames. The value of the control word defines the position of the synchronization word along a frame. The position of the synchronization word along the frame varies between consecutive frames.

DESCRIPTION OF THE DRAWINGS

Other features of the present invention should now be apparent from a reading of the following detailed description taken in conjunction with the accompanying drawings.

DETAILED DESCRIPTION OF PREFERRED EMBODIMENT

The present invention describes a frame synchronization technique that is used in digital data transmission. This technique involves the selection of a synchronization word that is suitable for good correlation in a receiver detector. Data or bits are interleaved within the synchronization word. These interleaved bits may be either traffic bits or control bits and they are interleaved within the synchronization word in a predetermined pattern, where this pattern is fixed for consecutive frames. Also, the interleaved traffic or control bits vary substantially between consecutive frames.

Figure 1:
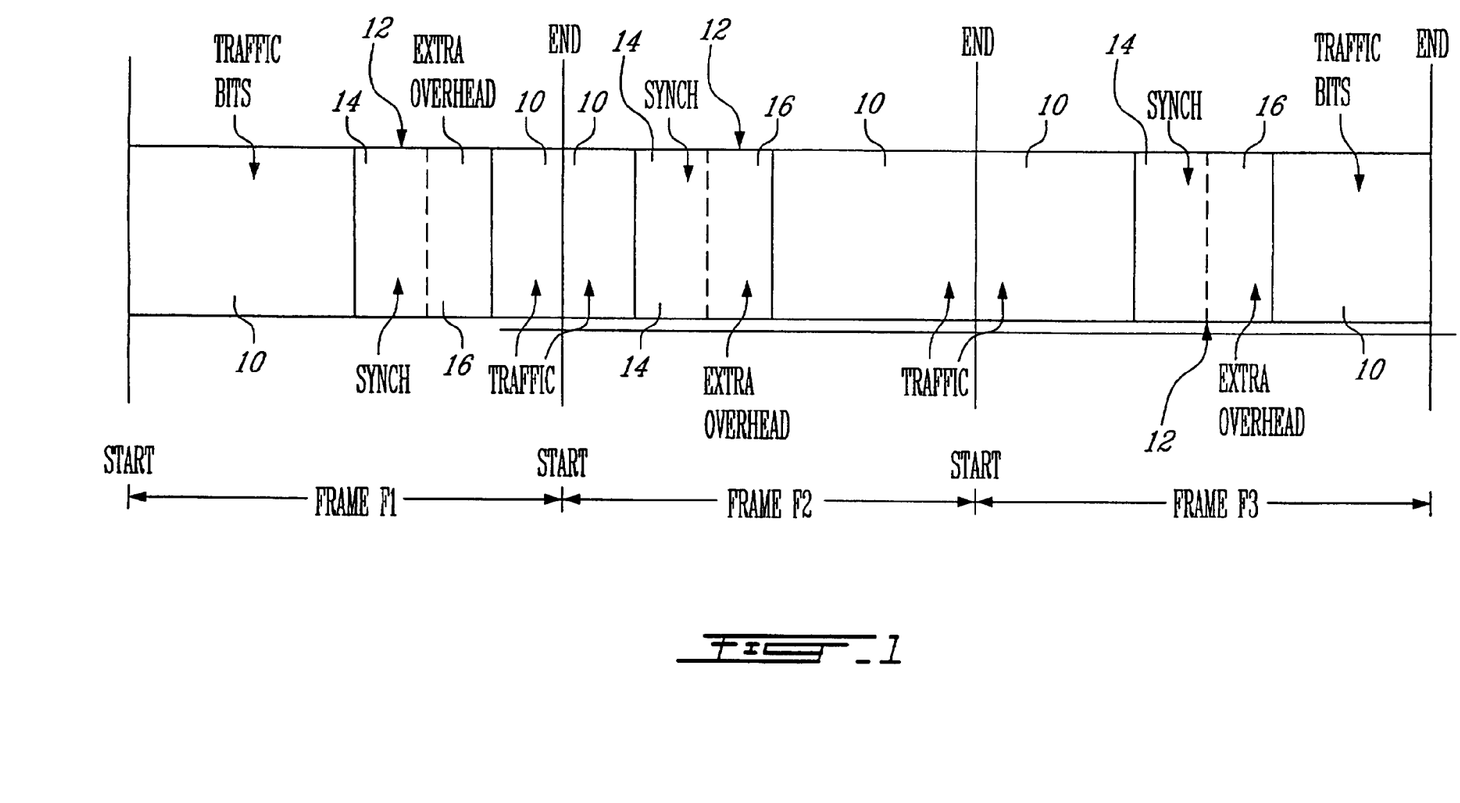
FIG. 1 is a diagram of consecutive frames, illustrating the synchronization scheme of the present invention.

Reference is now made to FIG. 1 which illustrates a stream of digital data. More particularly, there is illustrated in FIG. 1 three frames F1, F2 and F3. Each frame is defined as a 2 msec time interval which contains the traffic bits, shown in FIG. 1 in separate traffic bit fields 10. Also depicted in FIG. 1 is a word of 128 adjacent overhead bits, located pseudo-randomly in the frame. This is identified in FIG. 1 by the overhead word 12.

Figure 2:
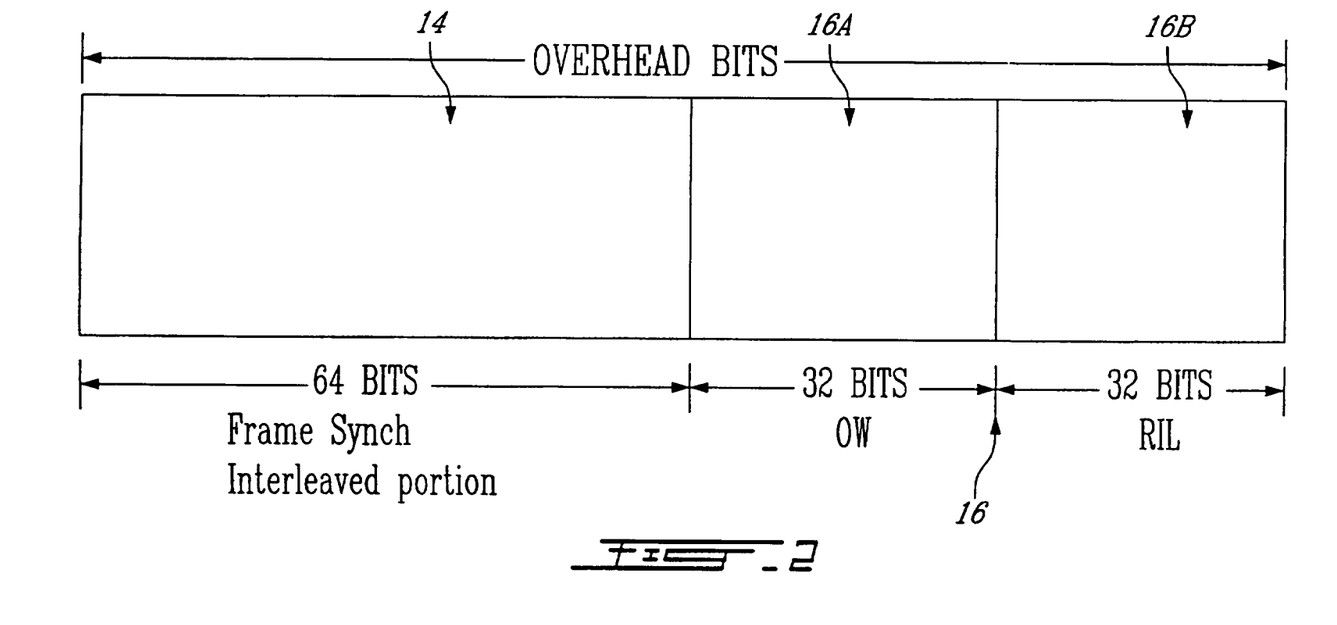
FIG. 2 illustrates somewhat more detail of a single frame of the consecutive frames of FIG. 1.

In FIG. 1 the overhead word in separated into a sync word 14 and an extra overhead word 16. In this regard also refer to FIG. 2 that shows in somewhat further detail a single one of the frames of FIG. 1. FIG. 2 also depicts the extra overhead word 16 as broken down into an orderwire word 16A and a radio information word 16B.

Depending upon the traffic rate, there will be a certain number of traffic bits. For example, in frame F1 of FIG. 1 these traffic bits appear in the field 10 on either side of the overhead field 12. For operation at say 256 Kbs, there are 512 traffic bits in a frame and 128 overhead bits in that frame.

Figure 3:
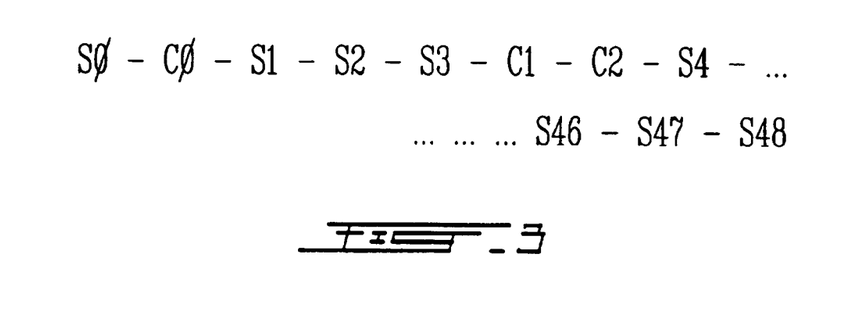
FIG. 3 is a diagram illustrative of the random interleaving of control bits within the synchronization word.

The aforementioned 128 overhead bits distributed as follows in the order in which they appear in the data stream. In this regard refer to FIGS. 1 and 2. The 128 bits are separated as follows:

64 bits form the framing word and they in turn are composed of a 15 bit control word (C0-C14). The control word provides the pseudo-random sequence seed. This determines the position within a frame that the synchronization word appears. The 64 bit framing word also includes a 49 bit sync word (S0-S48) for timing recovery. These bits are interleaved for security purposes, such as in the manner illustrated in FIG. 3 and discussed in further detail hereinafter.

32 bit orderwire word (W0-W31) corresponding to 16 Kbs (word 16A) 32 bit radio information word (R0-R31) corresponding to 16 Kbs (word 16B).

Now, with further reference to FIG. 1, it is noted that the overhead word 12 is disposed in the different frames illustrated in FIG. 1, at different positions along each frame. For example, the synchronization word in frame F1 is more toward the right of the frame while in frame F2 the synchronization word is more to the left of the frame, while in frame F3 the synchronization word is approximately in the middle of the frame. The position of the synchronization word along the frame is determined by the pseudo-random sequence represented by the control word (C0-C14).

As indicated previously, the sync word and the control word are interleaved so as to present a data stream with as little as possible repetition from frame to frame. A fixed interleaving scheme may be employed, however, it is preferred to have a random interleaving such as partially illustrated in the drawing of FIG. 3. It is noted that the 64 bits include a 15 bit control word (C0-C14) and a 49 bit sync word (S0-S48). The bit S0 represents the first bit of the sync word and appears at the beginning of the framing word. The bit S48 represents the end of the sync word and appears as the last bit of the framing word.

Two frame examples may be considered, one for a traffic rate of 256 and the other for a traffic rate of 1544. At 265 Kbs, there are 512 traffic bits and 128 overhead bits (20%) per frame for a total of 640, corresponding to 320 Kbs. At 1544 Kbs, there are 3088 traffic bits and 128 overhead bits (4.0%) per frame for a total of 3216, corresponding to 1608 Kbs.

In the disclosed embodiment there is one and only one overhead word in each frame. The first overhead word bit (S0) position varies pseudo-randomly from one frame to the next. There preferably is a forbidden zone at the end of a frame where bit S0 is not allowed to hop so as to prevent a collision with the next frame overhead word which could possibly be located at the start of the frame. This forbidden or dead zone is preferably at least 128 bits wide. Since the natural length of a pseudo-random (PN) sequence is a power of 2 to simplify the design, the largest possible power of 2 for the hopping time interval is used. There is also a small dead zone (preferably 1 bit) located at the beginning of the frame. This stems from the fact that the pseudo-random number generator that determines the frame beginning should not be 0. The following parameters apply:

a) The start of the frame is defined as the mux clk edge on which the frame counted goes back to 0.

b) The beginning of the overhead burst (S0) occurs at the soonest when the counter reaches 1.

c) The value found in the control word C0-C14 is always the actual position of the overhead burst in the frame (1,2,3 . . . ; never 0).

d) When the overhead burst hopping is disabled, the beginning of the overhead burst (S0) occurs when the counter reaches 0.

e) The PN generator which determines the position of the overhead burst is 15 bits long. It generates 32767 different states. Only as the highest rate are all these numbers required. At the lowest rates, the appropriate number of msb bits are masked to provide the required number of states.

Figure 4A:
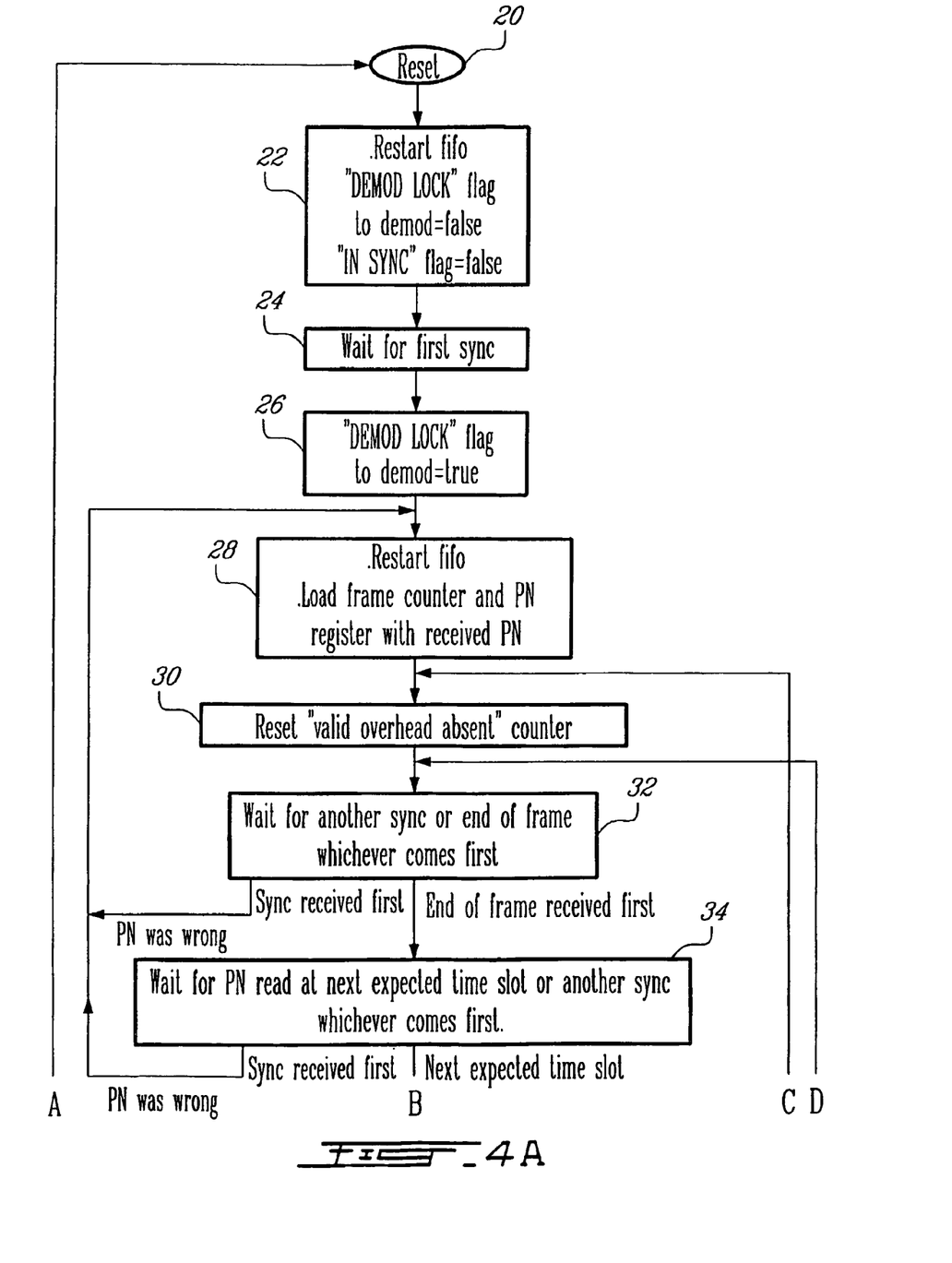
FIG. 4 is a flow chart illustrating the frame synchronization algorithm as in accordance with one embodiment of the present invention.
Figure 4B:
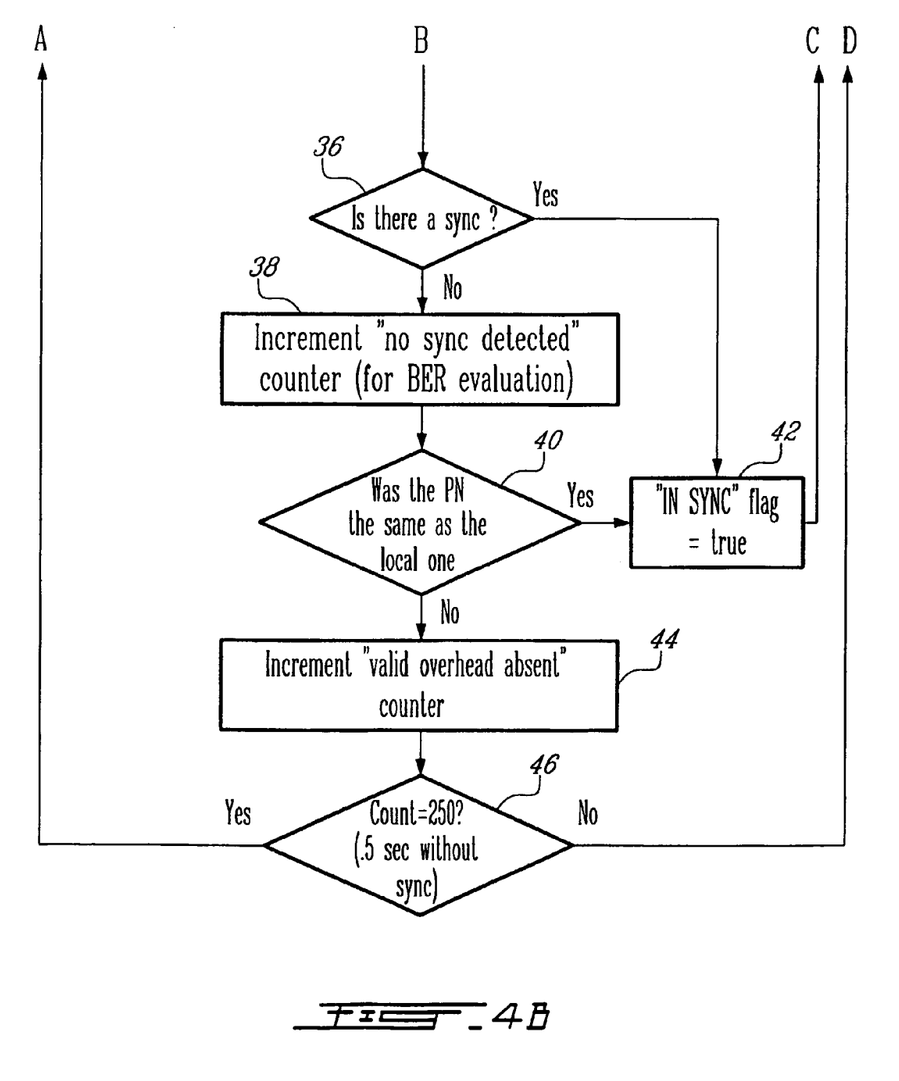

Now, reference is made to FIG. 4 which is a frame synchronization algorithm described by way of the flow chart of FIG. 4. In FIG. 4 the reset occurs at 20. From there the algorithm continues to box 22 where the "DEMOD LOCK" flag is false. Box 24 indicates a wait for the first sync signal. Box 26 indicates the "DEMOD LOCK" flag true. Valid sync words are first used by the demodulator to phase lock itself through the "DEMOD LOCK" status bit. This bit is set when the first "sync word" is detected, and reset after 250 frames without sync detect of a valid PN. Refer in particular to box 46 in FIG. 4.

The first sync word triggers the PN acquisition. Refer in FIG. 4 to boxes 26, 28, and 30. The PN is used to initialize the local frame counter as well as to load the comparator buffer used to check the frame synchronization on every sync word received. Once the frame counter has been initialized, the "IN SYNC" status bit is set; this bit is used to start the demux. The bit is reset at the same time as the "DEMOD LOCK" status bit, after 250 frames without either a sync detect or a valid PN.

With further reference to FIG. 4, it is noted that when the output of box 32 indicates that the sync is received first, the algorithm loops back to the input of box 28. If the output of box 32 indicates the end of the frame is received first, then the algorithm proceeds to box 34. If the sync signal is received first then PN is wrong and the algorithm loops back to the input of box 28. The output of box 34 indicates the next expected time slot and then the decision box 36 inquires as to whether there is a sync. If the answer is "YES" then the "IN SYNC" status bit is set. Refer to box 42 in FIG. 4. If the output of the decision box 36 is "NO" then the algorithm proceeds to box 38 for an increment and to decision box 40 to enquire as to whether the detected pseudo-random number is the same as the local one. If the answer is "YES" this also sets the status bit at box 42. If the decision from box 40 is "NO" this causes an increment at box 44 and initiates the count at decision box 46. A "NO" output from box 46 causes a loop of the algorithm back to the input of box 32. A "YES" decision from box 46 causes a resetting.

Figure 5:
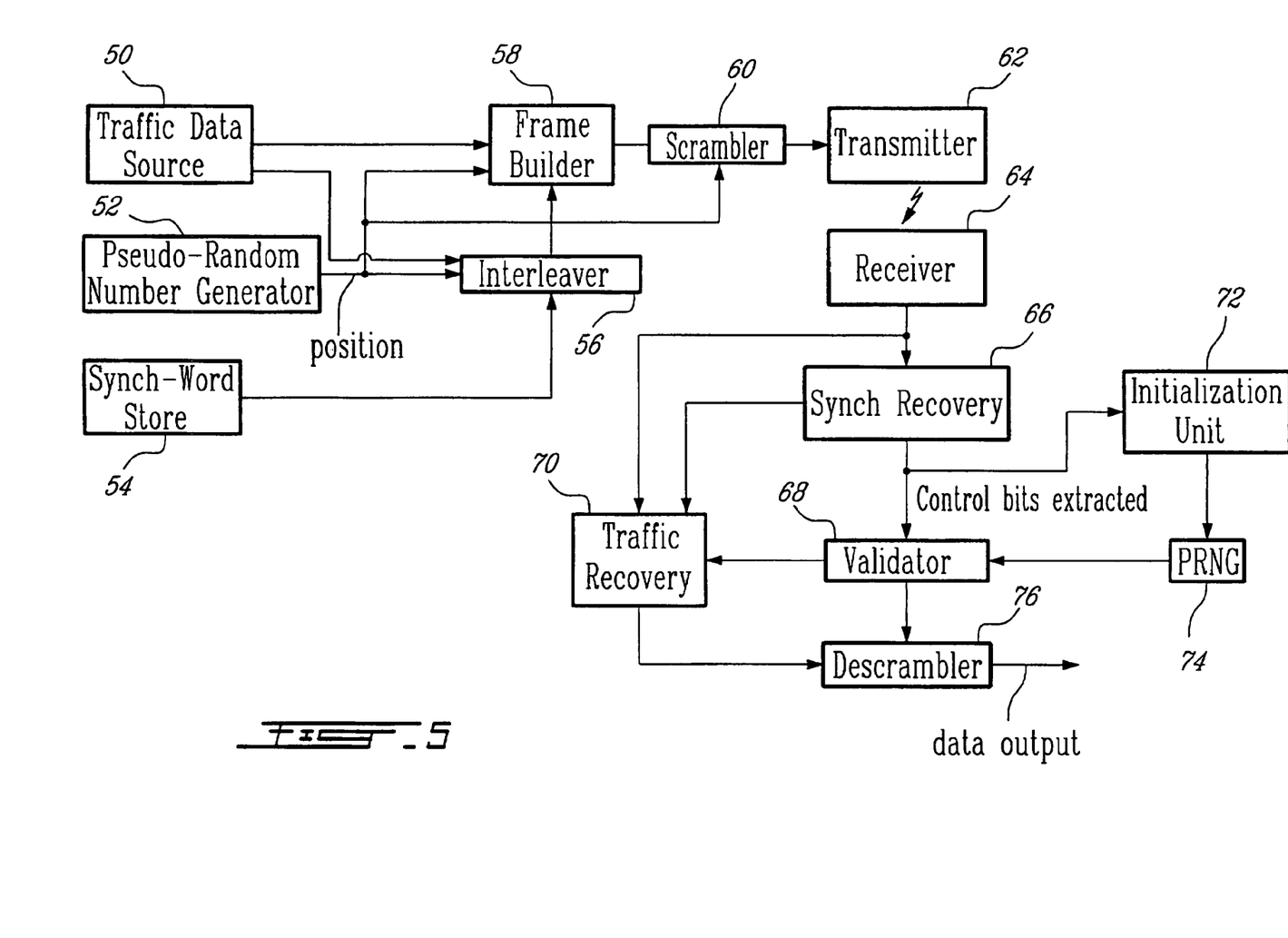
FIG. 5 is a block diagram of the system of the present invention.

Regarding the sync word itself, which is composed of 49 sync bits S0-S48, this can be any predetermined series of binary numbers. A number has been chosen by trial and error on the basis of its weak autocorrelation. There are 49 possible positions which can be considered when the data stream enters the correlator and gets compared to the data stream. The sync word has been chosen so that in each of the 49 different possible positions when it is entering the correlator, it looks like random data. More precisely, it is such that for any of the 49 positions, the number of bits that are alike is not larger that $n/2+2$, where n is the number of sync word bits compared. In one illustration, for the data stream halfway through the correlator, we have the number of bits alike equal to 11, which is not larger than $25/2+2=14.5$ Reference is now made to the block diagram of FIG. 5 which is a representation of hardware employed in accordance with the present invention for carrying out the frame synchronization. In FIG. 5 the traffic data is stored in the traffic data source 50. The control word bits are generated by the pseudo-random number generator 52. The sync word store 54 holds the sync word bits. It is noted that the source 50, the generator 52 and the store 54 all couple to an interleaver 56. Interleaver 56 provides the interleaving of bits, either traffic or control bits within the synchronization word.

The traffic data source 50, as noted in FIG. 5, couples to the frame builder 58. The output from pseudo-random number generator 52 also couples to the frame builder 58. Also, the output of the interleaver 56 couples to the frame builder 58. The circuit 58 builds the frame, on a frame-by-frame basis for coupling by way of a scrambler 60 to the transmitter 62.

As indicated previously, the bits that are interleaved in the synchronization word may be either traffic bits or control bits. This is why there is shown a connection to the interleaver 56 from both the traffic data source 50 as well as the generator 52.

Regarding the scrambler 60, the mux data (OW, RIL and traffic) of each frame is encrypted (scrambler) preferably by an XOR operation of a pseudo-random sequence having as its seed value the control word value.

FIG. 5 also shows the receiver portion of the system. This includes a receiver 64 that received the data transmitted from transmitter 62. The output of the receiver 64 couples to a synchronization recovery circuit 66 as well as to a traffic recovery circuit 70. The output of the recovery circuit 66 couples to a validator 68. The output of the validator couples to both the traffic recovery circuit 70 and a descrambler 76 with the data output being taken at the output of the descrambler 76. Also illustrated in the receiver section is an initialization unit 72 and a pseudo-random number generator 74.

The receiver unit of FIG. 5 operates as in accordance with the algorithm described by way of the flow chart of FIG. 4. Thus, if there is a sync detected (refer to decision box 34 in FIG. 4), the traffic data is recovered by way of traffic recovery circuit 70 to the output data line. The validator 68 receiving the control word, determines the position of traffic bits versus sync bits.

Also, in accordance with the flow chart of FIG. 4, if there is no sync, then by way of the decision box 40, if the pseudo-random number (control bits) is the same as the number from the generator 74, the validator 68 indicates a "IN SYNC" flag as per the box 42 in FIG. 4.

In FIG. 5 it is also noted that the control word from the validator 68 also couples to the descrambler 76 for the control thereof This control word controls the descrambling operation.

Having described a limited number of embodiments of the present invention, it should now be apparent to those skilled in the art that other embodiments and modifications thereof are contemplated as falling within the scope of the present invention. For example, the control bits in a particular frame may be used to determine the position of the sync word in that frame or, alternatively, the control bits in a particular frame can be used to determine the position of the sync word in a next frame. It could even determine the position in subsequent frames.

The invention claimed is:

1. A method of frame synchronization in a digital data transmission of data frames each having an overhead word and traffic bits, the method comprising the steps of:
selecting a synchronization word suitable for good correlation in a receiver detector;
interleaving bits of the synchronization word with control bits within the overhead word of each of the data frames, the interleaving being in a predetermined pattern and varying substantially between the consecutive data frames; and
varying a position of the overhead word with respect to the traffic bits within each one of the consecutive data frames in the digital data transmission in a predictable manner.

2. The method as claimed in claim 1, wherein said interleaving comprises interleaving said control bits, to define said position of said overhead word according to pseudo-random function.

3. The method as claimed in claim 2, wherein said step of interleaving comprises interleaving only said control bits with said bits of said synchronization word within said overhead word.

4. The method as claimed in claim 3, wherein additional overhead bits are positioned adjacent said control bits and said bits of said synchronization word interleaved, within said overhead word.

5. The method as claimed in claim 4, wherein said additional overhead bits comprise an orderwire word and a radio information link word.

6. The method as claimed in claim 2, further comprising of:
detecting an error in said synchronization word;
confirming that said frame synchronization method is valid when said error is detected and said control bits detected match and expected next value from said pseudo-random function.

7. The method as claimed in claim 3, wherein said synchronization word has an autocorrelation characterized by a number of alike bits being no larger than n/2+2, where n is the number of said bits in said synchronization word being compared.

8. The method as claimed in claim 7, wherein said synchronization word comprises 49 bits.

9. The method as claimed in claim 2, further comprising a step of one of: scrambling and encrypting said traffic bits using said position determined according to said pseudo-random function.

10. The method as claimed in claim 1, wherein said interleaving comprises interleaving said control bits, said control bits defining said position of said overheard word in a current frame.

11. The method as claimed in claim 1 wherein said interleaving comprises interleaving said control bits, said control bits defining said position of said overheard word in a next frame.

12. A frame synchronization system for a digital transmission of data frames each having an overhead word and traffic bits, said system comprising:
a synchronization store for providing a synchronization word;
a pseudo-random number generator for providing a control word including control bits;
an interleaver coupled from said synchronization store and said pseudo-random generator and for interleaving, within the overhead word, said control bits and bits of said synchronization word in a predetermined pattern which varies substantially between consecutive data frames; and
the value of said control word defining a position of said overhead word in respect to the.traffic bits, along each one of said frames, the position varying between consecutive data frames in a predictable manner.

13. The frame synchronization system as claimed in claim 12, wherein the value of the control word defines the position of the synchronization word interleaved within the overhead word along a current frame.

14. The frame synchronization system as claimed in claim 12, wherein the value of the control word defines the position of the synchronization word interleaved within the overhead word along a next frame.

15. The frame synchronization system as claimed in claim 12, further comprising a traffic data source and a frame builder with the output of the traffic data source, as well as the output from the interleaver coupling to the frame builder.

16. The frame synchronization system as claimed in claim 15, further comprising a scrambler coupled from the output of the frame builder, and a transmitter coupled from the output of the scrambler.

17. The frame synchronization system as claimed in claim 16 wherein said scrambler is controlled in accordance with the output from said pseudo-random number generator.

18. The frame synchronization system as claimed in claim 16, further comprising a receiver section, the receiver section comprising a sync recovery unit, a traffic recovery unit and a validator.

19. The frame synchronization system as claimed in claim 18, further comprising a receiver for coupling signals to the sync recovery unit and the traffic recovery unit, the output of the sync recovery unit coupling to the validator.

20. The frame synchronization system as claimed in claim 19, further comprising an initialization unit coupled from the output of the sync recovery unity and a pseudo-random number generator unit coupled from the initialization unit and having its output coupled to the vatidator.

21. The frame synchronization system as claimed in claim 20, further comprising a descrambler coupled from the output of the validator and the traffic recovery unit, with the data output taken from the output of the descrambler.

\* \* \* \* \*